United States Patent
FitzGerald et al.

(10) Patent No.: US 7,310,334 B1
(45) Date of Patent: Dec. 18, 2007

(54) METHOD AND APPARATUS FOR MEDIA STREAM MONITORING

(75) Inventors: Cary FitzGerald, Pleasanton, CA (US); Cullen Jennings, Milpitas, CA (US)

(73) Assignee: Cisco Technology, Inc., San Jose, CA (US)

( * ) Notice: Subject to any disclaimer, the term of this patent is extended or adjusted under 35 U.S.C. 154(b) by 1206 days.

(21) Appl. No.: 10/137,545

(22) Filed: Apr. 30, 2002

(51) Int. Cl.
 *H04L 12/28* (2006.01)
 *H04L 12/56* (2006.01)

(52) U.S. Cl. ............... 370/389; 370/401; 370/392; 370/352

(58) Field of Classification Search ........... 370/259, 370/260, 352–356, 389, 401
 See application file for complete search history.

(56) References Cited

U.S. PATENT DOCUMENTS

| | | | |
|---|---|---|---|
| 2005/0226172 A1* | 10/2005 | Richardson et al. | 370/260 |
| 2006/0041431 A1* | 2/2006 | Maes | 704/270.1 |
| 2006/0112400 A1* | 5/2006 | Zhang et al. | 719/328 |
| 2006/0122835 A1* | 6/2006 | Huart et al. | 704/258 |

OTHER PUBLICATIONS

H. Schulzrinne and GMD Fokus, "RTP Profile for Audio and Video Conferences with Minimal Control", Jan. 1996, pp. 1-17.
M. Handley and V. Jacobson, "SDP: Session Description Protocol", Apr. 1998, pp. 1-40.
H. Schulzrinne, GMD Fokus, S. Casner, R. Frederick, and V. Jacobson, "RTP: A Transport Protocol for Real-Time Applications", Jan. 1996, pp. 1-71.
Webpage http://www.cis.ohio-state.edu/~cliu/ipmultimedia/ entitled "Multimedia Over IP: RSVP, RTP, RTCP, RTSP", Jan. 8, 2002, pp. 1-27.

* cited by examiner

*Primary Examiner*—Ajit Patel
(74) *Attorney, Agent, or Firm*—Stolowitz Ford Cowger LLP

(57) ABSTRACT

A network processing device is signaled to establish a media path with another network processing device in a packet switched network with Session Initiated Protocol (SIP), International Telecommunication Union (ITU) standard H.323, MGCP, Megaco, or some other signaling protocol. The network processing device receives a request to send information to an observer device that is not directly in the media path. The network processing device then sends information about the media path to the observer device.

41 Claims, 2 Drawing Sheets

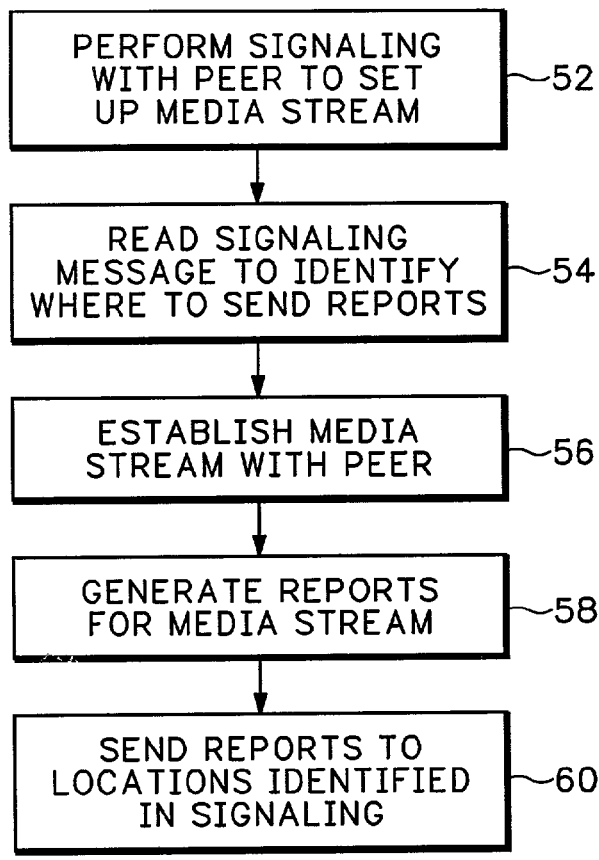
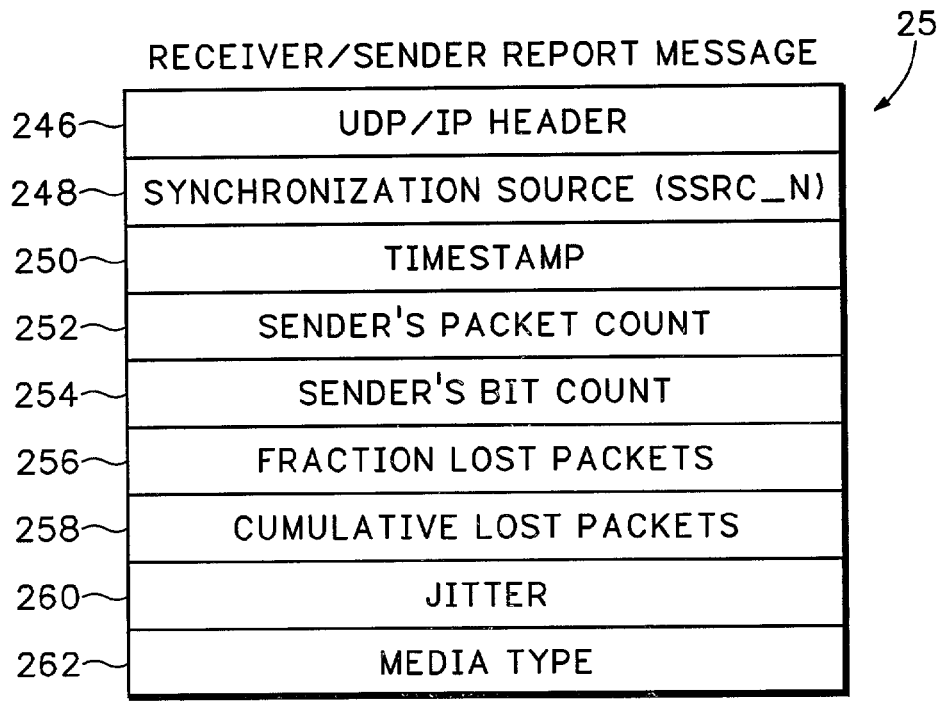

US 7,310,334 B1

METHOD AND APPARATUS FOR MEDIA STREAM MONITORING

BACKGROUND

A Voice Over IP (VoIP) call could be directed along a different media path, such as a Public Switched Telephone Network (PSTN), when the IP network carrying the VoIP call is suffering from poor quality. Gateways in the call path could also be notified to use different COmpressor/DECompressors (codecs), etc. when low quality of service is detected in the IP network. A billing system could bill a subscriber at a lower rate when the quality of a call is compromised. Real-time billing data could also be derived if a system could determine the number of bits transmitted or the type of media services used during a packet switched network connection. For example, different billing tables could be used for voice, fax, modem relay, or pass through calls.

Accordingly, different network processing devices, such as call agents, Session Initiated Protocol (SIP) proxies and H.323 gatekeepers, have an interest in monitoring media liveness and heath conditions. H.323 is a standard approved by the International Telecommunication Union (ITU) that defines how audiovisual data is transmitted across networks.

Media including audio and video data is transported over a packet switched network using a Real-time Transport Protocol (RTP) protocol. A Real-time Control Protocol (RTCP) is then used to report statistical information regarding the RTP connection. The RTCP reports contain information regarding the number of packets transmitted, the number of packets lost, latency, jitter information, etc. for IP packets in the RTP connection.

The problem is that the RTCP reports are only sent between the two gateways in the packet network that are conducting the RTP session and are not available to other network elements that may want to use the reports for policy or billing reasons.

The present invention addresses this and other problems associated with the prior art.

SUMMARY OF THE INVENTION

A network processing device is signaled to establish a media path with another network processing device in a packet switched network with Session Initiated Protocol (SIP), International Telecommunication Union (ITU) standard H.323, MGCP, Megaco, or some other signaling protocol. The network processing device receives a request to send information to an observer device that is not directly in the media path. The network processing device then sends information about the media path to the observer device.

The foregoing and other objects, features and advantages of the invention will become more readily apparent from the following detailed description of a preferred embodiment of the invention which proceeds with reference to the accompanying drawings.

BRIEF DESCRIPTION OF THE DRAWINGS

FIG. 2 is a flow diagram showing how a media endpoint in the packet switched network sends the report messages.

FIG. 3 is an example of the types of information contained in the report messages.

DETAILED DESCRIPTION

Figure 1:
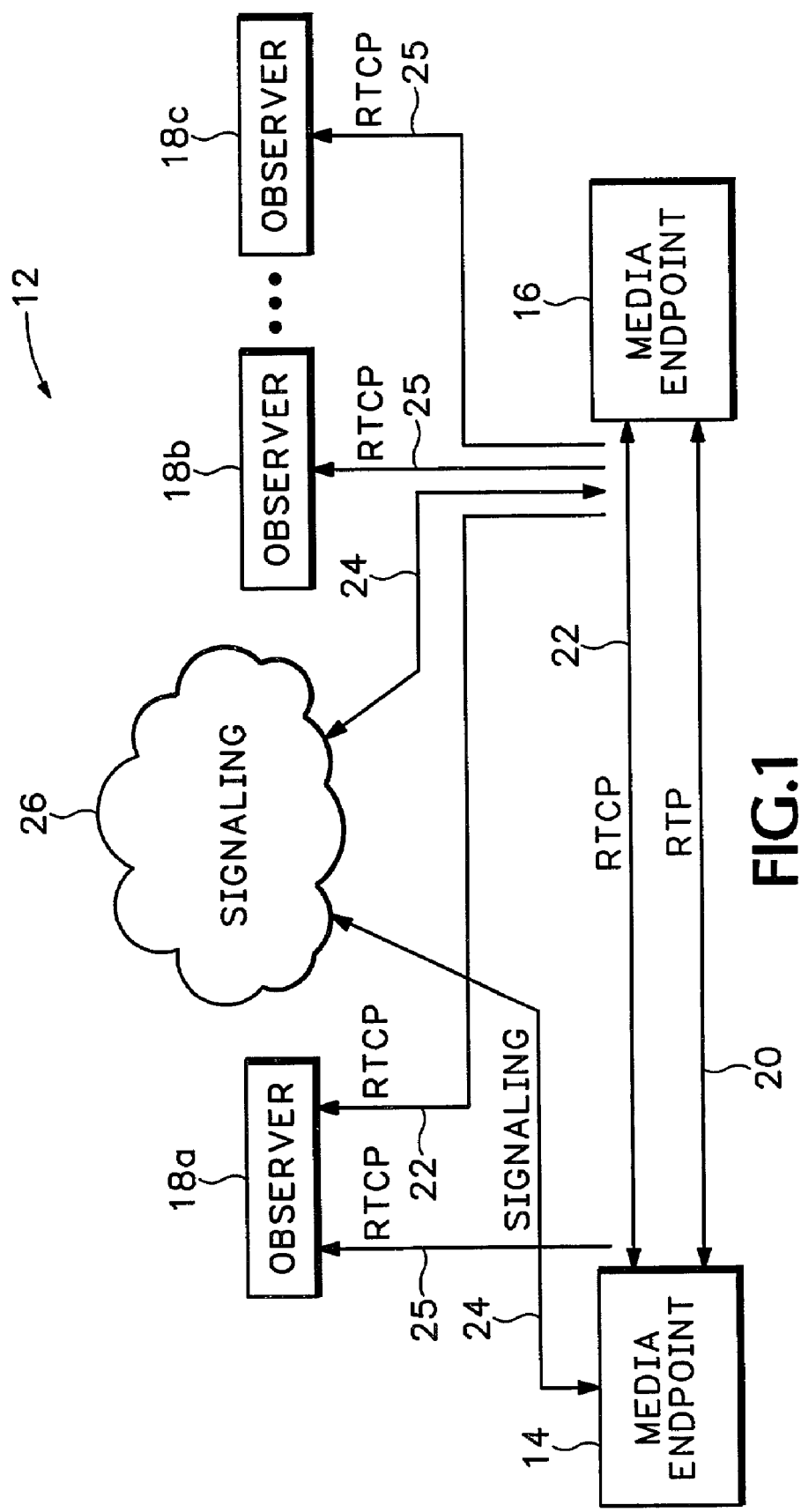
FIG. 1 is a diagram of a packet switched network that sends report messages to observer devices.

FIG. 1 shows a packet switched network 12 that includes two media endpoints 14 and 16. The media endpoints 14 and 16 can be any Internet Protocol (IP) phone, Gateway (GW) connected to a Public Switched Telephone Network (PSTN), GW connected to an analog phone, GW connected to any telephony network, or any other device that may need to process audio data.

A media path 20 is established between the two media endpoints 14 and 16 that carries media data in IP packets. The media path 20 can carry any video, audio or digital data. In one example, a Real Time Protocol (RTP) is used to send the media data between the two media endpoints. The RTP protocol is described in Request For Comment (RFC) 1889 and RFC 1890 which are each herein incorporated by reference. Signaling 24 is conducted through a signaling network 26 to establish the RTP path 20. Examples of protocols used for signaling 24 include H.323, Media Gateway Control Protocol (MGCP), Session Initiated Protocol (SIP), Megaco, etc.

A Real Time Control Protocol (RTCP) is associated with the RTP protocol and is used to periodically send reports 22 about the media path 20 between the two media endpoints 14 and 16. The RTCP reports 22 are also described in RFC 1889 and RFC 1890.

The signaling 24 causes the media endpoints 14 and 16 to send reports 22 to each other and to also send reports 25 to observer devices 18A, 18B and 18C. The observer devices 18A-18C might not participate directly in the media path 20, but still receive information about the media path 20 through reports 25. The reports 25 in one example are the same or a subset of the RTCP reports 22 sent between media endpoints 14 and 16.

In one example, the observer devices 18A-18C are servers or computers that provide one or more call monitoring functions, such as call billing, network congestion monitoring, etc. There can be any number of observer devices 18 that can listen to one or multiple media endpoints. The media endpoints 14 and 16 can also communicate with one or multiple observer devices 18. For example, observer device 18A can receive reports 25 from media endpoint 14 and media endpoint 16. The observers 18C and 18C in one configuration may only receive reports 25 from media endpoint 16.

The types of information about media path 20 contained in reports 25 can include: number of packets transmitted, number of lost packets, timestamp information, and jitter information, just to name a few. Another type of information that can be included in the sender reports is the current length of the call. Some of these information types are described in further detail below in FIG. 3.

Any protocol can be used for signaling 24 to initiate sending report messages 25 to observer devices 18A-18C. For example, the signaling 24 can be sent using a Media Gateway Control Protocol (MGCP), Session Initiated Protocol (SIP), H.323, Megaco, or any other protocol used for establishing a media path 20. In one example, a line is inserted into a Signaling Description Protocol (SDP) 24 that identifies where to send the reports 25.

Referring to FIGS. 1 and 2, the media endpoints 14 and 16 in block 52 perform signaling 24 through the signaling network 26. The signaling 24 establishes the media path 20. The media endpoints in block 54 determine from the signaling 24 where to send report messages 25 associated with the media path 20. The media endpoints 14 and 16 establish the media path 20 in block 56. The media endpoints then generate reports for the media path 20 in block 58 and in block 60 and send the reports to the locations identified in the signaling 24. In the example shown in FIG. 1, report messages 22 are sent between the media endpoints 14 and 16 and the report messages 25 are sent by the media endpoints 14 and 16 to the observer devices 18A-18C. However, as described above, report messages 25 can be sent from any number of media endpoints to any number observer devices 18.

There may be more than two media endpoints in the media path 20 (FIG. 1). For example there may be multiple phones conducting a conference call. The observer devices 18A-18C may receive reports 25 from each of the multiple media endpoints involved in the conference call.

Different criteria can be used for sending report messages 25 to observer devices 18. One criteria may be that every call setup request in signaling 24 initiates sending a report message 25 to a same one of the observer devices 18. In this situation, the observer device 18 may perform billing and congestion monitoring tasks for the media path 20. Another criteria may be long distance calls. Whenever one of the media endpoints 14 or 16 requests a long distance call, the signaling 24 also requests sending a report message 25 for the long distance call to one of the observer devices 18. In this case, the identified observer device 18 may only be concerned about tracking long distance calls. Other criteria for sending report message 25 may depend on the type of media stream usage, such as video, audio, fax, data, etc.

Extending Existing Protocols

Signaling

The SDP protocol is the signaling part of RTCP. The SDP corresponds to signaling 24 in FIG. 1. The SDP signaling currently only contains addresses for media endpoints participating in the media call. Additional addresses are allowed to be located in the SDP signaling. The media endpoint receiving the SDP signaling sends RTCP reports to the additional addresses identified in the SDP signaling. The media content packets are still only sent to the originating media endpoint for a call or to the multiple media endpoints that are participating in a conference call.

The SDP protocol is extended by adding a new addressing attribute. For example, an observer device may be located at the IP address 171.69.11.48. To cause the RTCP reports to be sent to the observer device 18 listening on port 10001 at the host 171.69.11.48, the following attribute is included in the SDP:

a=rtcp:171.69.11.48:10001.

There can be multiple a=rtcp:x.x.x.x.:x lines added in the SDP for each observer device that requests an RTCP report.

Sender Reports (SR)/Receiver Reports (RR)

FIG. 3 shows a report 25 and some of the different parameters that can be sent to one or more observer devices. This is not an exhaustive list, and other parameters can also be sent in the report message 240. The RTCP protocol uses Sender Reports (SR) and Receiver Reports (RR) to send statistical information about the media path. In order to identify different types of media usage, a RTCP extension 262 is added that allows SRs and RRs to indicate the payload type currently in use for a given Synchronization Source (SSRC) identifier. The report 25 extends the Session Description Protocol (SDP) and RTCP to allow sending RTCP-ONLY streams for signaling entities, such as SIP proxies.

The new media type field 262 identifies a particular format of the media flowing across the media stream 20 (FIG. 1). For example, different types of compressed MPEG data, audio data, video data, instant messaging data, etc. The observer devices 18 do not receive the media stream 20. So the media type field 262 is used by the observer devices 18 to identify the type of media in media stream 20. The observer devices 18 can use the media type field 262 in determining certain billing, policy, quality of service, authorization, etc.

The format of the report 25 described below is only one example of how the media type information may be implemented in the RTCP protocol. Different reports 25 can be implemented in different media path protocols and the media type information 262 may also be implemented differently in the RTCP protocol or in other protocols.

Other fields in the SR or RR reports include, a destination IP address located in the UDP/IP header field 246. The IP address can identify the receiving gateway or any one of the different observer devices that are sent the report message. A Synchronization Source field (SSRC_n) 248 identifies a particular stream of RTP packets so as not to be dependant on the network address. All packets from a synchronization source form part of the same timing and sequence number space. This allows a receiver to group packets by synchronization source for playback purposes.

Examples of synchronization sources include the sender of a stream of packets derived from a signal source, such as a microphone or a camera. A participant in the media path need not use the same SSRC identifier 248 for all the RTP sessions in a multimedia session. For example, when a participant generates multiple streams in one RTP session from a separate video cameras, each is identified with a different SSRC.

NTP Timestamp 250

This field indicates the wall clock time when the RTCP report was sent. The NTP timestamp may be used in combination with timestamps returned in reception reports from other receivers to measure round-trip propagation to those receivers.

Sender's Packet Count 252

The sender's packet count is the total number of RTP data packets transmitted by the sender since starting transmission up until the time this SR packet was generated. The sender's packet count 252 is reset if the sender changes its SSRC identifier.

While the same amount of data may be sent over the network, this data may be sent in a small number of large packets or in a large number of small packets. The large number of small packets may be used to provide a better QoS. However, a larger number of smaller packets may have a larger impact on network congestion. The sender's packet count 252 provides the observer device with the actual number of packets sent on the network for the media path.

Sender's Bit Count 254

The senders bit count 254, in one example, is the total number of payload octets (i.e., not including header or padding) transmitted in RTP data packets by the sender since starting transmission up until the time this SR packet 240 was generated. The sender's bit count is reset if the sender changes the SSRC identifier 248. This field 254 can be used to estimate the average payload data rate. The sender's bit count 254 is used for identifying the actual amount of data that is being transmitted by the sender.

The following two fields are from a Receiver Report (RR). The RRs give the profile of the sender's bandwidth use and can also be used for liveness and billing purposes.

Fraction Lost Packets 255

This field indicates the fraction of RTP data packets from source SSRC_n (field 248) lost since the previous SR or RR packet was sent. In one example, the value in field 255 is a fraction representing the number of packets lost divided by the number of packet expected.

Cumulative Number of Packet Lost 258:

This field indicates the total number of RTP data packets from source SSRC_n that have been lost since the beginning of reception. In one example, this is the number of packets expected less the number of packets actually received. The number of packets received includes any late or duplicate packets. Thus, packets that arrive later are not counted as lost, and the loss may be negative if there are duplicates. The number of packets expected, in one example, is the extended last packet sequence number received less the initial packet sequence number received.

Interrarrival Jitter 260

The jitter value in field 260 is determined by using the timestamps that indicate when a packet was transmitted and comparing that timestamp value to the time that the packets actually arrived. For example, if some packets take 10 milliseconds (ms) to arrive at the destination and other packets take 12 ms to arrive at the destination, there is 2 ms of jitter (J). The timestamps are also used to identify the actual delay (latency) for packets to go from the source gateway to the destination gateway.

In one example, an estimate of the statistical variance of the RTP data packet interrarrival time, is measured in timestamp units and expressed as an unsigned integer. The interrarrival jitter J is defined to be the mean derivation (smoothed absolute value) of the difference D in packet spacing at the receiver compared to the sender for a pair of packets. Absolute delay can be estimated by using the same technique that is specified in RFC 1889, substituting the NTP time in the SR for A:

The SSRC_n can be used to compute the round propagation delay to SSRC_r by recording the time A when the reception report block is received. The SSRC calculates the total round-trip time A-LSR using a last SR timestamp (LSR) field in the report 25, and then subtracting this field to leave the round-trip propagation delay as (A-LSR-DLSR). The term DLSR refers to Difference to Last Sender Report.

The accuracy of the MSM scheme depends on the accuracy of the NTP time mechanism. It is assumed that delay for RTCP is similar to delay for RTP. While this is true for many media types, it will not be true for all. For example, RTCP will experience an additional delay for DOCSIS access media. The differential delay over a given access media can be estimated and included in the calculation.

Security

RTCP information from the gateway may not be reliable. For example, a low QoS voice call may be indicated by the signaling between the gateway and the signaling proxy. However, during the call, video data is sent at a rate over the media path higher than what was initially indicated by the signaling.

It is possible to detect some amount of fraud from this information using the MSM scheme. Since the report message is being sent directly from the gateway that is actually participating in the call to the observer, the statistical information about the call is more accurately monitored.

In one example, a call generating zero or a very low number of bits in either direction is torn down, since there is not much value to the media path. This information can also be correlated with flow-based data from other sources like Cisco Netflow to detect patterns of fraud.

The MSM scheme has been shown used with RTCP, since RTCP works with different signaling protocols including MGCP, H.248, SIP, H.323, Megaco or SAP. However, other reporting protocols can be used for relaying the statistics for the media path. The MSM scheme can also be used for reporting statistics for any type of media, including voice, video, instant messaging data, or any other type of media path where statistical information needs to be reported to some service, device, or system.

The system described above can use dedicated processor systems, micro controllers, programmable logic devices, or microprocessors that perform some or all of the operations.

Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Having described and illustrated the principles of the invention in a preferred embodiment thereof, it should be apparent that the invention may be modified in arrangement and detail without departing from such principles. I claim all modifications and variation coming within the spirit and scope of the following claims.

The invention claimed is:

1. A method for monitoring a media path in a network, comprising:
   receiving, at a media endpoint, a request to send information to an observer device that is not in the media path from a device other than the observer device, the request identifying a location of the observer device; and
   sending information about the media path from the media endpoint in the media path to the observer device not in the media path.

2. A method according to claim 1 including receiving the request in signaling used for establishing the media path.

3. A method according to claim 2 including receiving the request over a packet based media path protocol.

4. A method according to claim 3 including receiving the request over a signaling protocol for Real Time Transfer Protocol (RTP) and the information is sent to the observer device using a Real Time Control Protocol.

5. A method according to claim 1 including sending the information to the observer in a report message format used in the media path to report media path statistics.

6. A method according to claim 1 including sending statistics in the information regarding an amount of data sent in the media path by a media path sender and an amount of data received in the media path by a media path receiver.

7. A method according to claim 1 including sending statistics in the information about when packets in the media path were sent from a media path sender and when packets in the media path were received at a media path receiver.

8. A method according to claim 1 including sending the information from both a media endpoint that sends packets in the media path and from a media endpoint that receives packets in the media path.

9. A method according to claim 1 including:
receiving multiple requests for the information from different observers devices or from one or more media endpoints associated with the different observer devices, and
sending the information to each of the different observer devices.

10. A network processing device, comprising:
a processor configured to participate in a media path connection over a packet switched network and receive a request to send information regarding the media path connection to a monitoring device not participating in the media path connection over a signaling network from a device other that the monitoring device, the processor obtaining information regarding the media path connection and sending the information to the monitoring device.

11. A network processing device according to claim 10 wherein the processor is configured to send a report message to a gateway at an opposite end of the media path connection and send the same, or portions, of the same report message to the monitoring device.

12. A network processing device according to claim 10 wherein the media path connection is used for transferring packets containing audio or video data.

13. A network processing device according to claim 10 wherein the media path connection is established using a Real Time Protocol (RTP) and the information is transmitted to the monitoring device using a Real Time Control Protocol (RTCP).

14. A network processing device according to claim 10 wherein the processor is part of a gateway that establishes the media path connection.

15. A network processing device according to claim 10 wherein the processor receives the request from a device that manages signaling for the media path connection and is coupled to the observer device.

16. A network processing device according to claim 15 wherein the processor is configured to receive one or more requests to send the information to multiple observer devices and send packets containing the information to IP addresses associated with each one of the multiple observer devices.

17. A network processing device according to claim 10 where the processor is configured to send an identifier in the information about the media path connection that identifies a type of data associated with the media path connection.

18. A protocol, comprising:
signaling messaging for establishing a media path over a packet based network and identifying locations that are not participating in the media path to receive statistics regarding the media path, the signaling messaging directly exchanged between devices participating in the media path over a signaling network; and
report messaging containing statistics for the media path that are sent to the locations identified in the signaling messaging.

19. A protocol according to claim 18 wherein the signaling messaging uses a Media Gateway Control Protocol (MGCP), Session Initiated Protocol (SIP), H.323, or Megaco.

20. A protocol according to claim 18 wherein the report messaging uses RTCP reports.

21. A protocol according to claim 18 wherein the report messaging includes statistics about number of packets sent in the media path and number of packets received in the media path.

22. A protocol according to claim 18 wherein the report messaging is sent from media paths at opposite ends of the media path.

23. A protocol according to claim 18 including an attribute to a RTP SDP packet that identifies the locations that are not participating in the media path.

24. An electronic storage medium containing software for monitoring a media path in a network when executed by a processor or multiple communicating processors, the software comprising:
code for receiving, at a media endpoint, a request to send information to an observer device that is not in the media path over a signaling network from a device other that the observer device, the request identifying a location of the observer device; and
code for sending information about the media path from the media endpoint in the media path to the observer device not in the media path.

25. An electronic storage medium according to claim 24 including code for receiving the request in signaling used for establishing the media path.

26. An electronic storage medium according to claim 25 including code for receiving the request over a packet based media path protocol.

27. An electronic storage medium according to claim 26 including code for receiving the request over a signaling protocol for Real Time Transfer Protocol (RTP) and sending the information to the observer device using a Real Time Control Protocol.

28. An electronic storage medium according to claim 24 including code for sending the information to the observer in a report message format used in the media path to report media path statistics.

29. An electronic storage medium according to claim 24 including code for sending statistics in the information regarding an amount of data sent in the media path by a media path sender and an amount of data received in the media path by a media path receiver.

30. An electronic storage medium according to claim 24 including code for sending statistics in the information about when packets in the media path were sent from a media path sender and when packets in the media path were received at a media path receiver.

31. An electronic storage medium according to claim 24 including code for sending the information from both a media endpoint that sends packets in the media path and from a media endpoint that receives packets in the media path.

32. An electronic storage medium according to claim 24 including:
code for receiving multiple requests for the information from different observers devices or from one or more media endpoints associated with the different observer devices, and
code for sending the information to each of the different observer devices.

33. A system for monitoring a media path in a network, comprising:
means for receiving, at a media endpoint, a request to send information to an observer device that is not in the media path over a signaling network from a device other that the observer device; and means for sending information about the media path from the media endpoint in the media path to the observer device not in the media path.

34. A system according to claim 33 including means for receiving the request in signaling used for establishing the media path.

35. A system according to claim 34 including means for receiving the request over a packet based media path protocol.

36. A system according to claim 35 including means for receiving the request using a signaling protocol for Real Time Transfer Protocol (RTP) and sending the information to the observer device using a Real Time Control Protocol.

37. A system according to claim 33 including means for sending the information to the observer in a report message format used in the media path to report media path statistics.

38. A system according to claim 33 including means for sending statistics in the information regarding an amount of data sent in the media path by a media path sender and an amount of data received in the media path by a media path receiver.

39. A system according to claim 33 including means for sending statistics in the information about when packets in the media path were sent from a media path sender and when packets in the media path were received at a media path receiver.

40. A system according to claim 33 including means for sending the information from both a media endpoint that sends packets in the media path and from a media endpoint that receives packets in the media path.

41. A system according to claim 33 including:

means for receiving multiple requests for the information from different observer devices or from one or more network processing devices associated with the different observer devices; and means for sending the information to each of the different observer devices.

* * * * *

UNITED STATES PATENT AND TRADEMARK OFFICE
CERTIFICATE OF CORRECTION

| | | |
|---|---|---|
| PATENT NO. | : 7,310,334 B1 | Page 1 of 1 |
| APPLICATION NO. | : 10/137545 | |
| DATED | : December 18, 2007 | |
| INVENTOR(S) | : Gacry Fitzgerald | |

It is certified that error appears in the above-identified patent and that said Letters Patent is hereby corrected as shown below:

At column 8, line 20, please delete "that" and insert -- than --.

At column 9, line 2, please delete "that" and insert -- than --.

Signed and Sealed this

Second Day of February, 2010

David J. Kappos
*Director of the United States Patent and Trademark Office*